Patented Apr. 26, 1949

2,468,324

UNITED STATES PATENT OFFICE 2,468,324

PROCESS FOR THE PREPARATION OF IMIDAZOLONES

Robert Duschinsky, Essex Fells, N. J., assignor to Hoffmann-La Roche Inc., Nutley, N. J., a corporation of New Jersey No Drawing. Application March 21, 1946, Serial No. 656,146

7 Claims. (Cl. 260—309)

This invention relates to a novel method for the decarboxylation of compounds of the general formula:

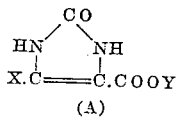
(A)

to obtain products of the general formula:

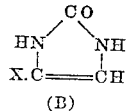
(B)

wherein X and Y represent lower alkyl such as methyl, ethyl, propyl, and the like.

The invention also relates to the novel compound 4-methylimidazolone-2.

This application is a continuation-in-part of application Serial No. 533,396, filed April 29, 1944, Patent No. 2,397,250, granted March 26, 1946. Reference is also made to my copending application Serial No. 590,509, filed April 26, 1945, now abandoned.

I have found that if compounds of the general formula (A) given above are saponified, decarboxylation takes place to produce compounds of the general formula (B). This decarboxylation is quite surprising in its action, inasmuch as it would be expected that saponification of compounds of the general formula (A) would result in the production only of the corresponding imidazolone-carboxylic acids. The reaction appears to involve an initial formation of a labile carboxylic acid, followed by decarboxylation without intermediate isolation of that acid.

After the saponification, the reaction mixture is neutralized, and the alkylimidazolone is separated. The decarboxylation can be effected by means of an aqueous alkaline solution, such as sodium hydroxide or barium hydroxide, in the presence of heat.

The products produced according to my process are useful as intermediates in the preparation of other organic compounds, such as biotin, desthiobiotin, and homologs and analogs thereof.

Examples of carrying out my transformation are given for the purpose of illustration:

EXAMPLE 1

*4-methylimidazolone-2*

34 g. 4-methyl-5-imidazolone-(2)-carboxylic acid ethyl ester were dissolved in 215 cc. 0.93 N NaOH (1 mole) and the solution kept 68 hours at 50–55°. After cooling it was neutralized to pH 7 by gradual addition of 37.5 cc. 5N HCl, which was accompanied by much carbon dioxide evolution and crystallization of the reaction product. The mixture was stirred in an ice bath for 1 hour, the methylimidazolone filtered off and washed chlorine free with some ice cold water. After drying in an oven at 60°, a first crop of 6.6 g. was obtained. M. P. 184–192°.

The mother-liquor was concentrated in vacuo, while the pH, which had the tendency to increase, was adjusted to 7 by gradual addition of 7 cc. N HCl, and was finally brought to dryness. The white residue was extracted 3 times with 35 cc. of boiling absolute ethanol, and once with 95 per cent ethanol. The alcoholic extracts, after separation from the undissolved sodium chloride, were concentrated to dryness, thus yielding a second crop of 8.55 g. methylimidazolone melting at ca. 178°. Total yield: 15.15 g.

Sometimes the first crop of reaction product did not crystallize directly, but only after partial concentration of the solution in vacuo.

To obtain a pure same, the substance was twice recrystallized from 2 volumes boiling water. M. P. 202.5–204.5 (after softening at 190°). For the analysis it was sublimed at 1 mm. (200° bath).

The substance is soluble in water, methanol, ethanol, acetone, also in hot dioxane, ethylacetate and nitrobenzene; insoluble in benzene, chloroform, ether and petroleum ether.

The aqueous or alcoholic solution reduces ammoniacal silver nitrate and gives with ferric chloride solution a deep purple coloration.

EXAMPLE 2

*4-ethylimidazolone-2*

To a solution of 16.8 g. ethyl propionylacetate (prepared according to Breslow, Baumgarten and Hauser, J. Am. Chem. Soc. 66, 1286, (1944)) in 27 cc. acetic acid, there was added dropwise with stirring and within 1 hour a solution of 7.36 g. sodium nitrite in 18 cc. water, the temperature being kept by cooling at 5 to 7° C. Then 60 cc. water were added and stirring was continued, while the temperature was allowed to rise to 26° C. within 2 hours. After eliminating some excess of nitrous acid by addition of 4 g. urea, the mixture was extracted twice with 50 cc. ether. The ether extract was washed 3 times with 15 cc. sodium bicarbonate solution, the third washing being alkaline. After drying the ethereal solution over sodiumsulfate, the solvent was evaporated, leaving 13.53 g. of a light yellow oil, $d^{n}_{26}$=1.439. This product was ethyl-α-oximinopropionyl acetate.

A mixture of 3.05 g. foregoing oximino-compound, 13.5 cc. ethanol, 1.76 cc. 10 N hydrochloric acid and 35 cc. water, was hydrogenated for 40 minutes in the presence of 0.6 g. palladium charcoal catalyst containing 3.3 percent palladium at about 1600 pounds p. s. i. pressure and at a temperature of 30–33° C. After filtering from the catalyst, 1.76 cc. 5 N hydrochloric acid, and a solution of 2.14 g. potassium cyanate in 9 cc. water were added. The mixture was concentrated on a water bath in an evaporating dish until the volume was 20 cc. Upon cooling 1.94 g. 4-ethyl-5-imidazolone-(2)-carboxylic acid ethyl ester crystallized, which melted at 171–173°. Recrystallization from water and sublimation at 0.6 mm. and 200° (bath) raised the melting point to 182–184° C. For the following decarboxylation step the crude product was used.

To a solution of 3.94 g. 4-ethyl ester in 214 cc. boiling water was added a solution of 9 g. crystallized barium hydroxide octohydrate in 50 cc. boiling water. After heating the mixture for 4½ hours at 85° C. the deposited barium carbonate, amounting to 4.3 g., was filtered off. The small amount of barium still remaining was eliminated as sulfate by addition of 11.2 cc. N sulfuric acid to the solution. The latter was concentrated to dryness, the residue was recrystallized from 20 cc. water. Yield: 1.45 g. melting at 192°–194°. Evaporation of the mother liquor yielded a second crop of 0.37 g. The isolated 4-ethylimidazolone-2 gives an intense purple ferric chloride reaction. It can be sublimed at 0.7 mm. and 170–175° C. (bath). Kolshorn (Ber. 37, 2477, (1904) obtained ethylimidazolone from aminomethyl ethyl ketone, but reported a considerably lower melting point, namely, 166–167°.

EXAMPLE 3

*4-methylimidazolone-2*

To a solution of 340 g. (2 moles) of 4-methyl-5-imidazolone-(2)-carboxylic acid ethyl ester in 1450 c. of water and 840 cc. of ethanol, which was kept refluxing with continuous stirring, a hot solution of 680 g. (2.15 moles) of crystallized barium hydroxide in 2800 cc. of water, was added gradually within two hours. Too fast addition of the barium hydroxide results in a bulky precipitate which disintegrates with difficulty. Heating and stirring was then continued for four to six hours, until the precipitation of the heavy, fast-settling barium carbonate was complete. After filtering the hot solution, the small residual amount of barium was eliminated by addition of ca. 250 cc. of N sulfuric acid. Evaporation gave a crystallizing sirup which was dissolved in 50 cc. of boiling water and cooled. A bulky crystalline, slightly yellowish mass resulted, which was sucked dry and washed with a little ice-cold water. Yield 140–150 g. M. P. 185–188°. The product was 4-methylimidazolone-2.

Wherever the term "imidazolone" or its structural formula is shown, all tautomeric forms are intended to be embraced.

I claim:

1. A process which comprises decarboxylating by saponifying compounds of the general formula:

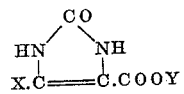

to produce compounds of the general formula:

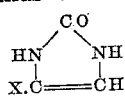

wherein X and Y represent lower alkyl.

2. The process of claim 1 in which X represents methyl.

3. The process of claim 1 in which X represents ethyl.

4. The process of claim 1 in which an alkaline saponifying agent is employed.

5. The process of claim 1 in which the reaction is carried out by means of an aqueous alkaline solution at a temperature of about 50°–60°.

6. The process of claim 1 in which barium hydroxide solution is employed as the saponifying agent.

7. The process of claim 1 in which the saponification is carried out by means of an aqueous alkaline solution followed by neutralization of the solution and isolation of the resulting 4-alkylimidazolone-2.

ROBERT DUSCHINSKY.

REFERENCES CITED

The following references are of record in the file of this patent:

Berichte, vol. 26, (1893), page 2204.
Beilstein, 4th edition, vol. 24, page 62.